June 25, 1957  R. S. ROOT  2,796,964
OIL TIGHT FRICTION CLUTCH
Filed Dec. 9, 1953
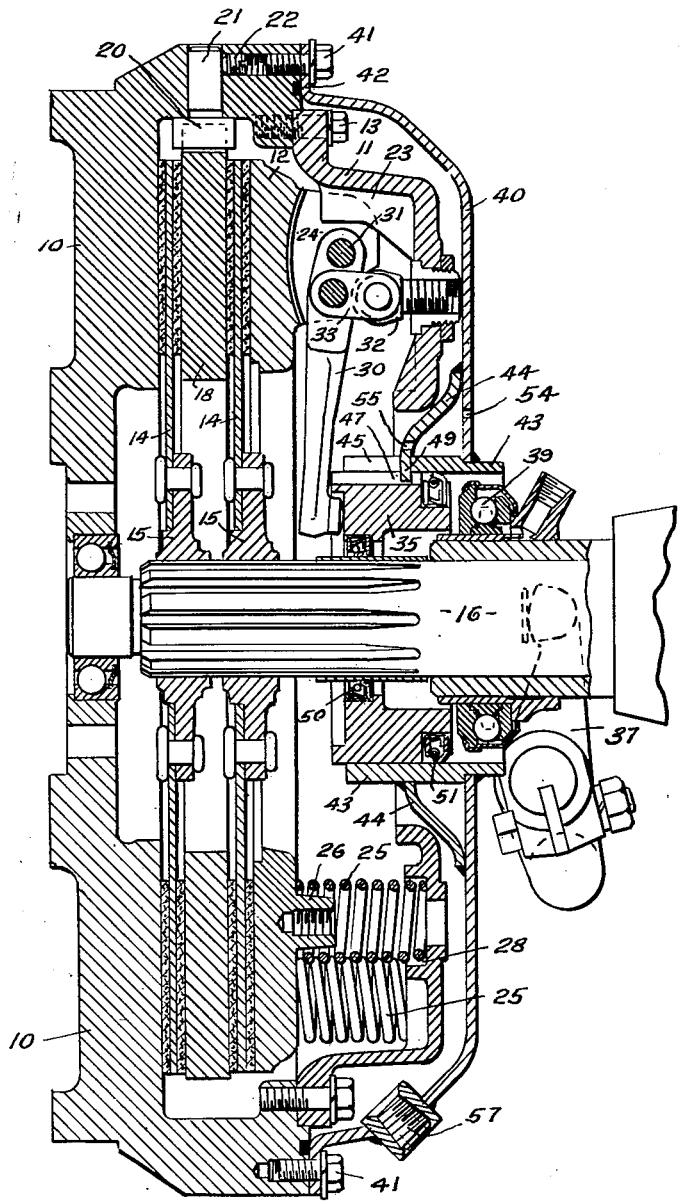
INVENTOR.
Robert S. Root
BY
D. Emmett Thompson
ATTORNEY.

United States Patent Office 2,796,964
Patented June 25, 1957

2,796,964

OIL TIGHT FRICTION CLUTCH

Robert S. Root, Westvale, N. Y., assignor to Lipe-Rollway Corporation, Syracuse, N. Y., a corporation of New York Application December 9, 1953, Serial No. 397,088

3 Claims. (Cl. 192—112)

This invention relates to friction clutches particularly of the type employed for automotive use, and has as an object a friction clutch embodying a structural arrangement wherein the driven member of the clutch and the release mechanism are enclosed in an oil tight compartment, provision being made for actuation of the release mechanism without the escape of oil from within the housing.

The invention consists in the novel features and in the combinations and constructions hereinafter set forth and claimed.

In describing this invention, reference is had to the accompanying drawing which is a vertical sectional view of a clutch structure embodying my invention.

The driving member of the clutch includes a body 10, a back plate 11, and a pressure plate 12. In automotive use, the body 10 constitutes the fly wheel of the engine. The rear face of the body is recessed to receive the driven member of the clutch. The back plate consists of an annular member fixedly secured to the rear side of the fly wheel, as by screws 13.

The driven member consists of a disk 14 fixedly secured to a hub member 15 slidably mounted on the splined end of the driven shaft 16. In the embodiment shown, there are two of the driven disks, and there is provided an intermediate driving plate 18, formed with notches at its periphery, to receive driving lugs 20 having circular stem portions 21 mounted in the rim portion of the fly wheel and secured in place as by set screws 22.

The back plate 11 and the pressure plate 12 are formed with interlocking driving lugs 23, 24, and the pressure plate is urged axially toward the fly wheel by a series of compression springs 25. The inner ends of the springs 25 are mounted on bosses 26 formed on the rear side of the pressure plate, and the opposite ends of the springs are positioned in recesses 28 formed in the confronting side of the back plate 11. The disks 14 are provided with annular friction faces which are engaged by the body 10, pressure plate 12, and intermediate plate 18.

The pressure plate 12 is moved rearwardly to release the clutch by a series of levers 30 mounted at their outer ends on pivot pins 31, the levers being pivotally connected to supporting studs 32 by links 33. The inner ends of the levers 30 are moved inwardly by a collar 35, slidably mounted on the driven shaft 15, the collar being actuated by the conventional throw-out yoke 37 through the instrumentality of an antifriction thrust bearing 39. The general arrangement of the clutch, with the exception of the collar 35, is disclosed in the copending application of Spase and Root, Serial No. 396,862, filed December 8, 1953, now Patent Number 2,788,876.

A closure 40 is secured at its periphery to the flange of the fly wheel, as by screws 41. A gasket 42 is provided to effect an oil tight joint between the closure and the fly wheel. A sleeve 43 is fixedly secured in the central portion of the closure as by being welded thereto. The sleeve 43 encircles the throw-out collar 35. In the construction shown, the closure at its central portion is provided with an inner wall 44 spaced axially inwardly from the closure. The inner portion of the sleeve 43 is formed with a slot 45, and the throw-out collar 35 is formed with a keyway 47. The slot 45 and keyway 47 are positioned in registration and the inner wall 44 of the closure is formed with a tab or key 48 extending through the slot 45 and into the keyway 47, whereby the throw-out collar is capable of axial movement relative to the sleeve 43, but the collar and sleeve are connected together by the tab 48, whereby rotation is imparted to the collar 35 through the closure member. An oil seal 50 is mounted in the inner portion of the bore of the collar 35 to effect an oil tight seal between the collar and the driven shaft 16. Also, a seal 51 is mounted at the outer end of the collar 35 and is cooperable with the bore of the sleeve 43 to prevent the escape of oil between these members.

The outer wall portion of the closure 40 is formed with a relatively small vent aperture 54, and the inner wall 44 is provided with a similar aperture 55. The aperture 55 is located in close proximity to the sleeve 43, and the venting aperture 54 is spaced further outwardly from the axis of the shaft 16. These vent apertures provide for the ingress and egress of air brought about by temperature changes within the clutch so as to prevent the build up of pressure within the clutch and lessen the likelihood of the escape of oil past the seals 50, 51 upon rise of temperature of the clutch. The radial spacing of the vent apertures 54, 55 prevent, or substantially reduce, the escape of oil through the vent apertures.

In the structure disclosed, the closure 40 is adapted to the clutch without modifying the structure thereof, or interfering with its operation, and yet the closure, in conjunction with the body 10 of the driven member, forms an oil tight compartment which functions to retain the oil within the clutch with substantially no leakage or escape of the oil over long periods of service. The closure is provided with a plug 57 to permit filling and draining of the oil from within the clutch structure.

What I claim is:

1. A friction clutch structure having a driving disk, a driven shaft, a coaxially arranged driven member mounted on said driven shaft in confronting relation to the driving disk, release mechanism, a collar slidably mounted on said driven shaft and operable upon axial movement toward the driving member to actuate said release mechanism, a closure member fixedly secured in oil tight relation to the peripheral portion of the driving disk and forming, in conjunction therewith, a housing in which said driven member and release mechanism is mounted, said closure having a sleeve encircling said collar, the central portion of said closure being formed with axially spaced apart inner and outer walls fixedly secured to said sleeve, said inner wall being formed with a vent aperture in proximity to said sleeve, and said outer wall being formed with a vent aperture spaced radially outwardly from the vent aperture in said inner wall.

2. A friction clutch structure having a driving disk, a driven shaft, a coaxially arranged driven member mounted on said driven shaft in confronting relation to the driving disk, release mechanism, a collar slidably mounted on said driven shaft and operable upon axial movement toward the driving member to actuate said release mechanism, a closure member fixedly secured in oil tight relation to the peripheral portion of the driving disk and forming, in conjunction therewith, a housing in which said driven member and release mechanism is mounted, said closure having a sleeve encircling said collar, the central portion of said closure being formed with axially spaced inner and outer walls fixedly secured to said sleeve, said inner wall having a portion slidably engaging said throw-out collar and operable to transfer rotation from said sleeve to said collar.

3. A friction clutch structure having a driving disk, a driven shaft, a coaxially arranged driven member mounted on said driven shaft in confronting relation to said driving disk, release mechanism, a collar slidably mounted on said shaft and operable upon axial movement toward the driving member to actuate said release mechanism, a closure member fixedly secured in oil tight relation to the peripheral portion of the driving disk and forming, in conjunction therewith, a housing in which said driven member and release mechanism is mounted, the central portion of said closure being formed with inner and outer walls, a sleeve encircling said collar, said inner and outer walls being fixedly secured to said sleeve at axially spaced apart points, said sleeve being formed on its periphery with an axially extending slot, said inner wall having a radially inwardly extending tab positioned in said slot and operable to transfer rotation from said sleeve to said collar, said inner wall being formed with a vent aperture in proximity to said sleeve, and said outer wall being formed with a vent aperture spaced radially outwardly from the vent aperture in said inner wall.

References Cited in the file of this patent

UNITED STATES PATENTS

| 814,132 | Hele-Shaw | Mar. 6, 1906 |
| 2,057,802 | Tatter | Oct. 20, 1936 |
| 2,519,449 | Findley | Aug. 22, 1950 |

FOREIGN PATENTS

| 1,007,099 | France | Feb. 6, 1952 |